(12) United States Patent
Baek et al.

(10) Patent No.: US 11,254,257 B2
(45) Date of Patent: Feb. 22, 2022

(54) SYSTEM AND METHOD OF CONTROLLING A VEHICULAR HEADLAMP FOR PREVENTING A SHADOW AREA

(71) Applicants: HYUNDAI MOTOR COMPANY, Seoul (KR); KIA MOTORS CORPORATION, Seoul (KR)

(72) Inventors: Jei Hyun Baek, Yongin-si (KR); Jae Woong Lee, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 325 days.

(21) Appl. No.: 16/444,627

(22) Filed: Jun. 18, 2019

(65) Prior Publication Data
US 2020/0164791 A1    May 28, 2020

(30) Foreign Application Priority Data
Nov. 27, 2018  (KR) .......................... 10-2018-0148040

(51) Int. Cl.
| | |
|---|---|
| *B60Q 1/115* | (2006.01) |
| *B60R 11/04* | (2006.01) |
| *B60Q 1/14* | (2006.01) |
| *B60R 11/00* | (2006.01) |

(52) U.S. Cl.
CPC ............ *B60Q 1/115* (2013.01); *B60Q 1/1407* (2013.01); *B60R 11/04* (2013.01); *B60Q 2200/38* (2013.01); *B60Q 2300/132* (2013.01); *B60R 2011/004* (2013.01)

(58) Field of Classification Search
CPC .......... B60Q 1/0023; B60Q 1/26; B60Q 3/80; B60Q 3/225; B60Q 1/1423; B60Q 2300/42; B60Q 2900/30; B60Q 3/51; B60Q 3/54; B60Q 3/745; B60Q 1/04
See application file for complete search history.

(56) References Cited

U.S. PATENT DOCUMENTS

| | | | | |
|---|---|---|---|---|
| 2007/0253597 | A1* | 11/2007 | Utida | G06K 9/3241 382/104 |
| 2009/0323366 | A1* | 12/2009 | Furusawa | B60Q 1/143 362/466 |
| 2014/0307456 | A1* | 10/2014 | Ishida | B60Q 1/122 362/513 |

* cited by examiner

*Primary Examiner* — Wei (Victor) Y Chan
(74) *Attorney, Agent, or Firm* — Lempia Summerfield Katz LLC (57) ABSTRACT

A system and method control a vehicular headlamp for preventing a shadow area between a low beam and a high beam of a headlamp using a camera unit. The method includes periodically determining whether a high beam of the vehicular headlamp is lit or illuminated. Upon determining that the high beam is illuminated, the method includes determining whether a darkness cell is formed in front image data of the vehicle, which is transmitted from a camera unit. Upon determining that the darkness cell is formed, the method includes changing a leveling motor to be directed upward by 1 step and storing a changed number of steps. Upon determining that the darkness cell is not formed, the method includes driving the leveling motor by the pre-stored number of steps.

8 Claims, 10 Drawing Sheets

Cells divided from image

FIG. 7

CB23~CB27 and CB30~CB34 > A → DN
A: reference brightness for determining DN

SYSTEM AND METHOD OF CONTROLLING A VEHICULAR HEADLAMP FOR PREVENTING A SHADOW AREA

This application claims the benefit of priority to Korean Patent Application No. 10-2018-0148040, filed on Nov. 27, 2018, which is hereby incorporated by reference as if fully set forth herein.

BACKGROUND

Field of the Disclosure

The present disclosure relates to a system and method of controlling a vehicular headlamp for preventing a shadow area, and more particularly, to a system and method of controlling a vehicular headlamp for preventing a shadow area formed between a low beam and a high beam of a headlamp using a camera unit.

Discussion of the Related Art

In general, a vehicular headlamp is a lighting device or lamp attached to a vehicle that performs the important function of lighting up, i.e., illuminating a road ahead of the vehicle during nighttime driving and requires brightness for checking traffic obstacles at a distance of 100 m (330 ft) during the nighttime.

When the light is emitted from a vehicular headlamp to illuminate the front of a vehicle, the emission angle of the light is generally fixed. When freight or cargo with a predetermined or greater weight is loaded on the vehicle, or a predetermined or greater number of passengers ride in the vehicle, the vehicle body may be inclined backwards. Thus, the emission angle of the vehicular headlamp may be changed in an upward direction.

In order to legally prevent this, a low beam of the headlamp may be set to be directed downward to a position that satisfies regulations. However, the high beam of the headlamp is maintained in an upward position.

In order to overcome the problem of the prior art, a sensor is installed at a rear side of the vehicle. Additionally, an auto leveling device for automatically directing the emission angle of the headlamp downward depending on the number of passengers and a superimposed load degree is applied to the vehicle.

However, due to the auto leveling device, a section or a shadow area is formed in which light is not transmitted between the low beam and the high beam of the headlamp on a road surface during nighttime driving of a vehicle. Thus, depending on the case, the shadow area may obstruct the visual field of a driver of the vehicle and may cause a serious accident.

Some overseas original equipment manufacturers (OEMs) for manufacturing auto leveling devices have produced auto leveling devices for performing an auto leveling operation. The auto leveling operation is performed by connecting a low beam and a high beam to each other to configure one base plate and operatively associating the low and high beams of the headlamp during an auto leveling operation.

However, according to such technology, the weight of the base plate for supporting both the low and high beams of the headlamp is inevitably increased. Therefore, a high-strength bracket and a high-performance motor to operate the base plate need to be further included. Accordingly, the cost of the lamp is increased and the total weight of the lamp module assembly is increased, thereby causing various additional problems in terms of fuel efficiency, package enlargement, or the like.

In some Korean automobile manufacturers, the position of a vehicle is sensed in real time. Then, a dynamic leveling system is applied to low beam leveling, depending on a sensing result value.

Figure 1:
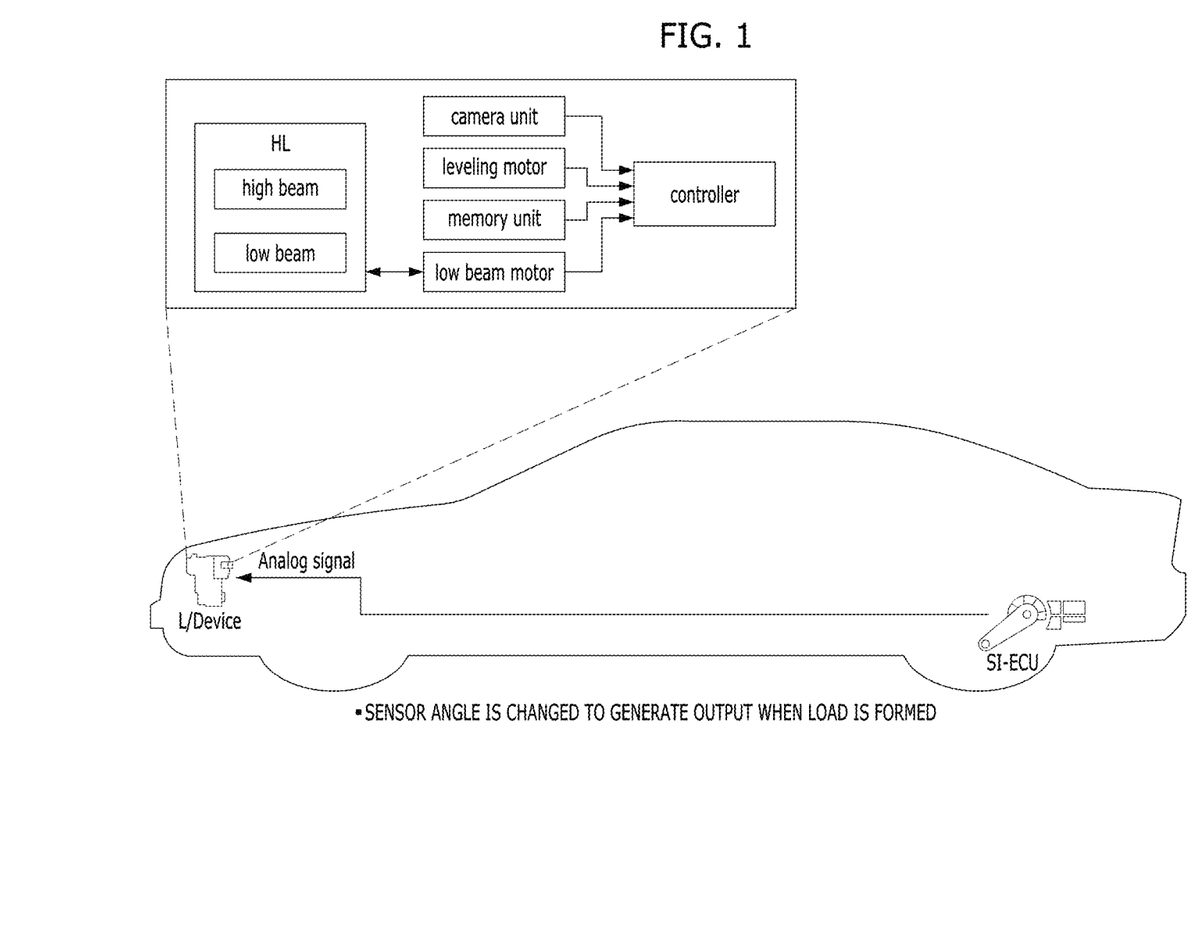
FIGS. 1-3 are diagrams of a shadow area that is formed between a low beam and a high beam of a conventional headlamp.
Figure 2:
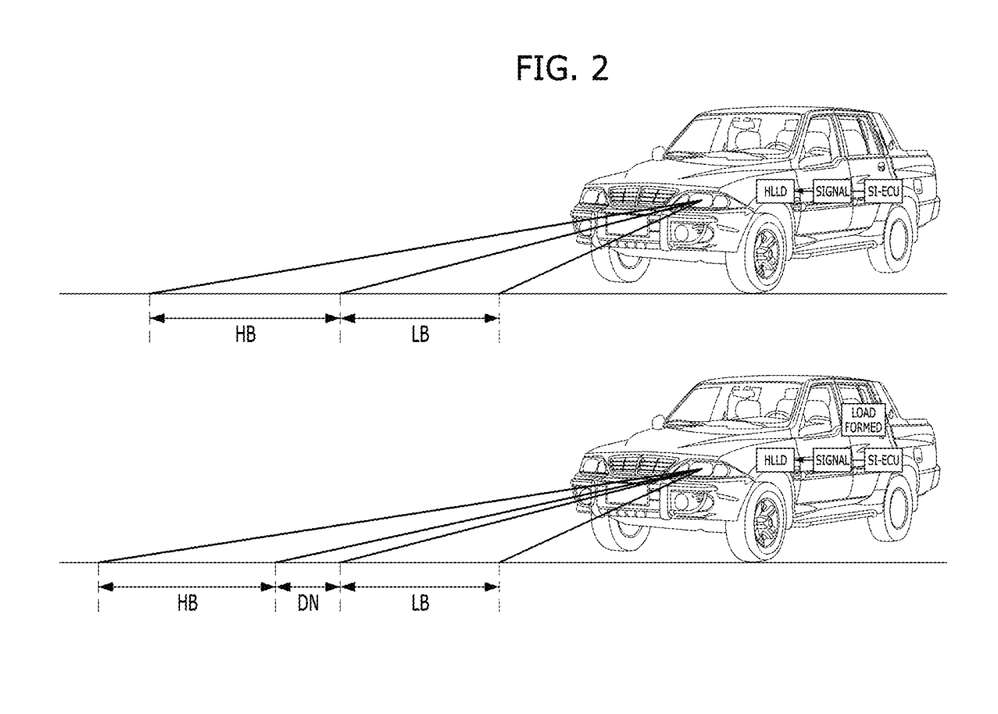
Figure 3:
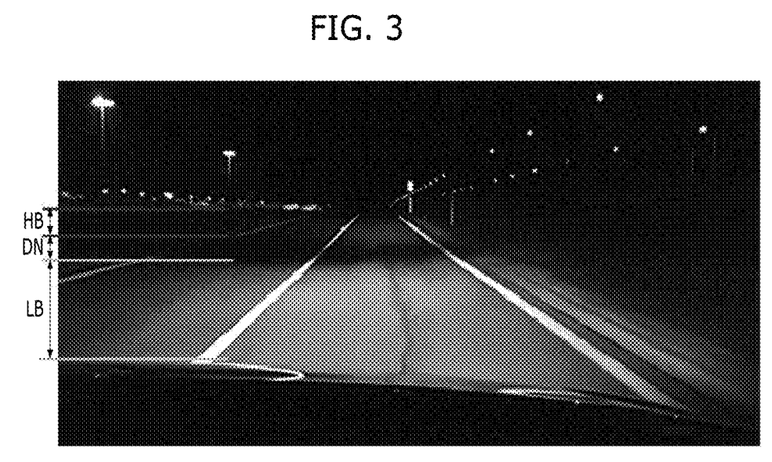

For example, as seen from FIGS. 1 and 2, when a beam of a headlamp of a Sensor Integrated Electronic Control Unit (SI-ECU), which is installed only at a rear side, is output, a shadow area is formed at a wayside due to an increase in the number of passengers of the vehicle or an increase in the weight of freight.

Figure 4:
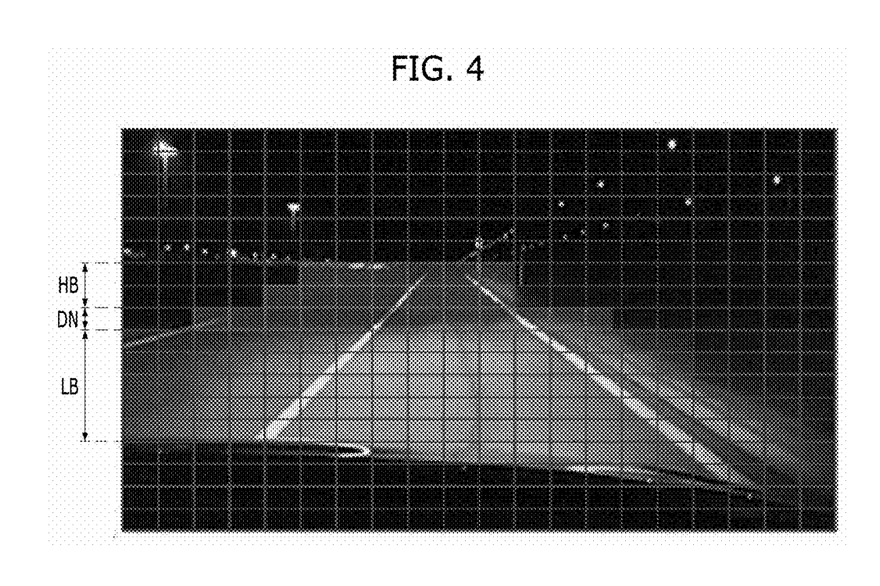
FIGS. 4 and 5 are diagrams of a shadow area that is formed between a low beam and a high beam of a headlamp of a conventional specific vehicle model.
Figure 5:
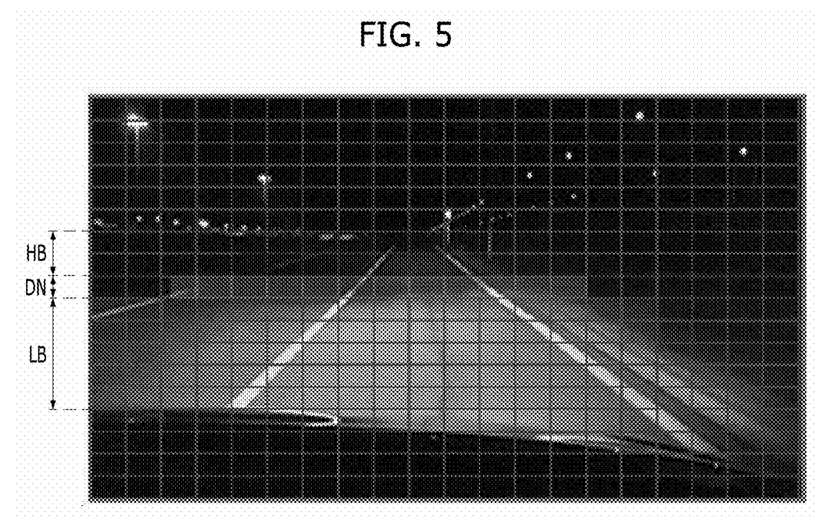

As seen from FIGS. 4 and 5, in the case of different vehicle models A, B, C, D, E, and F (shown in FIG. 8), when a headlamp leveling device (HLLD) is operated, a shadow area is formed at a front wayside of all the vehicles.

However, in the case of a dynamic leveling system, a sensor, a sensor suspension bracket, and wiring need to be additionally installed at the front axis of the vehicle compared with a conventional system. Thus, the dynamic leveling system is disadvantageous in that cost is increased and a total weight of a vehicle is also increased. Additionally, there is a problem in that a shadow area is formed between a low beam and a high beam of a headlamp in a specific section.

Therefore, a dynamic leveling system using an auto leveling device that uses a base plate, or a sensor, a sensor suspension bracket, and wiring has limitations in terms of problems such as increased cost and weight, fuel efficiency issues, and package size issues because of installation of additional components.

SUMMARY OF THE DISCLOSURE

Accordingly, the present disclosure is directed to a system and method of controlling a vehicular headlamp for preventing a shadow area that substantially obviates one or more problems due to limitations and disadvantages of the related art.

An object of the present disclosure is to provide a system and method of controlling a vehicular headlamp for preventing a shadow area between a low beam and a high beam of a headlamp using a camera unit in order to prevent problems in terms of a weight increase and a package size.

Additional advantages, objects, and features of the disclosure are set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a system for controlling a vehicular headlamp for preventing a shadow area includes a camera unit installed in front of a vehicle and configured to transmit image data obtained by photographing a front side of the vehicle. The system further includes a controller configured to periodically determine whether a high beam of the vehicular headlamp is lighted. The controller is further configured to determine whether a darkness cell is formed in front image data of the vehicle, which is transmitted from the camera unit, upon determining that the high beam is lighted. The controller is also configured to change a leveling motor to be directed upward by 1 step upon determining that the darkness cell is formed. The controller is further configured to drive the leveling motor by a pre-stored a number of steps (Step '2') upon determining that the darkness cell is not formed. The system further includes a memory unit configured to store a number of steps (Step '2') obtained by changing the leveling motor upward by 1 step.

In another aspect of the present disclosure, a method of controlling a vehicular headlamp for preventing a shadow area includes periodically determining whether a high beam of the vehicular headlamp is lighted. The method further includes, as a result of the determining, upon determining that the high beam is lighted, determining whether a darkness cell is formed in front image data of the vehicle, which is transmitted from a camera unit. The method further includes, as a result of the determining, upon determining that the darkness cell is formed, changing a leveling motor to be directed upward by 1 step and storing a changed number of steps (Step '2'). The method also includes, as a result of the determining, upon determining that the darkness cell is not formed, driving the leveling motor by the pre-stored number of steps (Step '2').

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Various embodiments of the present disclosure are described in detail for those of ordinary skill in the art to easily implement the disclosure with reference to the accompanying drawings. However, the present disclosure may be implemented in various different forms and is not limited to these embodiments. To clearly describe the present disclosure, parts unrelated to the description are omitted in the drawings and like reference numerals in the specification denote like elements.

Throughout the specification, one of ordinary skill in the art would understand terms "include", "comprise", and "have" to be interpreted by default as inclusive or open rather than exclusive or closed unless expressly defined to the contrary. Further, terms such as "unit", "module", etc. disclosed in the specification mean units for processing at least one function or operation, which may be implemented by hardware, software, or a combination thereof.

Throughout the specification, when a certain part "includes" a certain component, this indicates that the part may further include another component instead of excluding another component unless there is no different disclosure. The same reference numbers will be used throughout the drawings to refer to the same parts.

Hereinafter, a system and method of controlling a vehicular headlamp for preventing a shadow area to which embodiments of the present disclosure are applicable are described in detail with reference to FIGS. 6-10.

Figure 6:
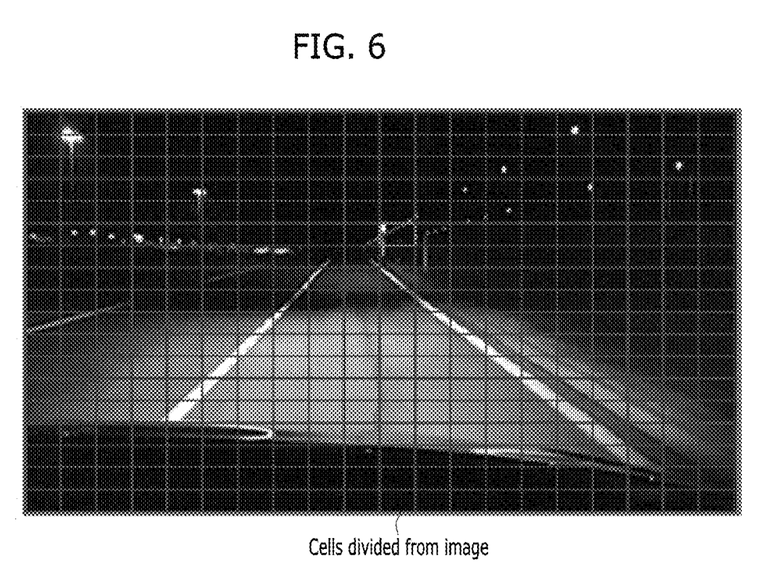
FIGS. 6 and 7 are diagrams of an operation of a camera unit included in a system for controlling a vehicular headlamp for preventing a shadow area according to an embodiment of the present disclosure.
Figure 7:
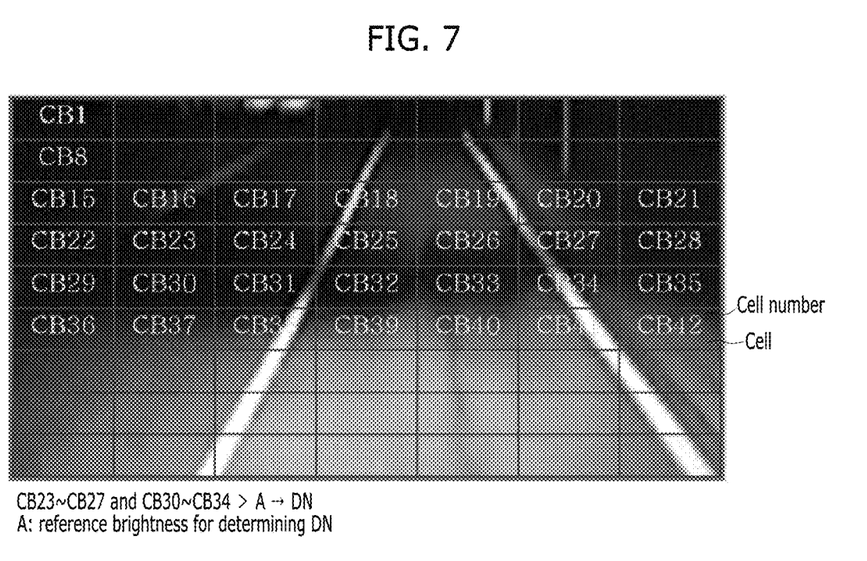
Figure 8:
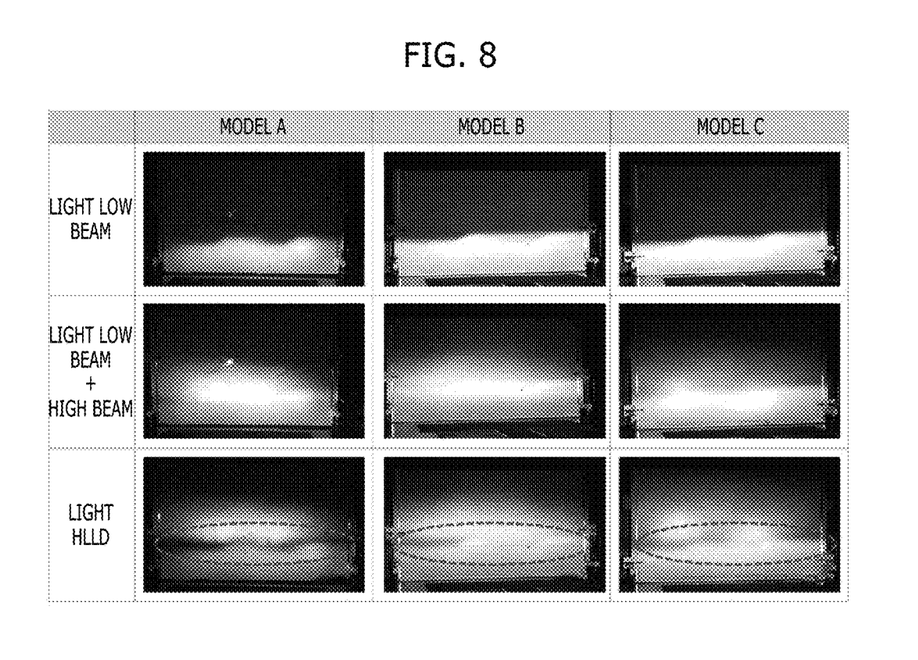
FIGS. 8 and 9 are diagrams of an image segment operation of a camera unit included in a system for controlling a vehicular headlamp for preventing a shadow area according to an embodiment of the present disclosure.
Figure 9:
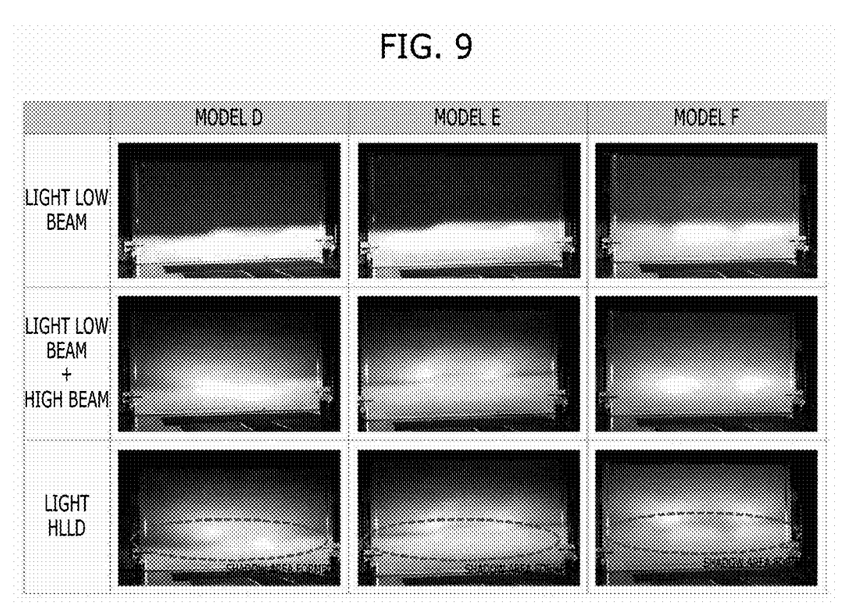

FIGS. 6 and 7 are diagrams of an operation of a camera unit included in a system for controlling a vehicular headlamp for preventing a shadow area according to an embodiment of the present disclosure. FIGS. 8 and 9 are diagrams of an image segment operation of a camera unit included in a system for controlling a vehicular headlamp for preventing a shadow area according to an embodiment of the present disclosure.

Referring to FIGS. 6-10, a system for controlling a vehicular headlamp for preventing a shadow area according to the present disclosure may include a controller, a memory unit for reading and storing data under control of the controller, and a camera unit for photographing a front side of the vehicle and transmitting the captured image to the controller.

In this embodiment, the camera unit may be installed at a front side of the vehicle and may transmit image data obtained by photographing the front side of the vehicle to the controller.

The controller may periodically determine whether a high beam of the vehicular headlamp is lighted. The controller may further determine whether a darkness cell is formed in the front image data of the vehicle, which is transmitted from the camera unit upon determining that the high beam is lighted. The controller may also change a leveling motor to be directed upward by 1 step upon determining that the darkness cell is formed. The controller may further drive the leveling motor by a pre-stored number of steps (Step '2') upon determining that the darkness cell is not formed.

The memory unit may each store a number of steps (Step '2') obtained by changing the leveling motor upward by 1 step or a number of steps (Step '1') of a low beam motor for adjustment of leveling.

The controller may segment the front image data of the vehicle in units of preset cells. The controller may further drive the low beam motor to correspond to an output value of a rear axis sensor of the vehicle when a low beam of the vehicular headlamp is lighted, an additional person rides in the vehicle, a freight or a load is additionally loaded, an internal weight of the vehicle is equal to or greater than a preset weight, or an output value of the rear axis of the vehicle is received.

The controller may periodically determine whether the high beam of the vehicular headlamp is turned off. The controller may further repeatedly perform a driving operation of the leveling motor when the high beam is not turned off. On the other hand, when the high beam is turned off, the controller may drive the leveling motor according to a pre-stored number of steps (Step '1').

According to an embodiment of the present disclosure, the memory unit may store road light distribution information of low and high beams reflected forward when a vehicular headlamp is designed. The memory unit may also store shadow area information on a difference degree between road distribution of the high beam and road distribution of the low beam when the low beam is directed downward via leveling.

When the low beam is directed downward from a preset reference position, the controller may control driving of the low beam motor for adjustment of the low beam. When the controller controls driving of the low beam motor to direct the low beam upward, the controller may predict a step number of the low beam motor and may restore the low beam to a preset low beam leveling position.

However, a method of determining a shadow area present between low and high beams using road light distribution information of the low and high beams may be a prediction method using an initial optical pre-design. In this case, a prediction result may be different from an actual result on a road that reflects a high or low beam of a headlamp.

In order to overcome this difference, according to various embodiments of the present disclosure, a camera unit may be additionally applied. Thus, formation of a shadow area may be reduced by minutely adjusting a headlamp when the shadow area is formed.

According to an embodiment of the present disclosure, sizes of colors red, green, and blue (R, G, and B) included in an image captured by photographing the front side of the vehicle, i.e., the area in front of the vehicle, via the camera unit may be defined as stages 0-255. The controller may determine 'Darkness' when a color size in a current specific section is equal to or less than a preset constant value. The controller may determine 'Brightness' when the color size is equal to or greater than the preset constant value, as shown in FIGS. 6 and 7.

According to an embodiment of the present disclosure, as shown in FIGS. 8 and 9, when a front image captured by the camera unit is segmented in units of cells and darkness is formed in road light distribution between the low and high beams, a step of the leveling motor may be adjusted to be directed upward.

Accordingly, the controller may apply a method of comparing data after and before a high beam in units of cells to differentiate a shadow area, which is described with reference to FIG. 10.

Figure 10:
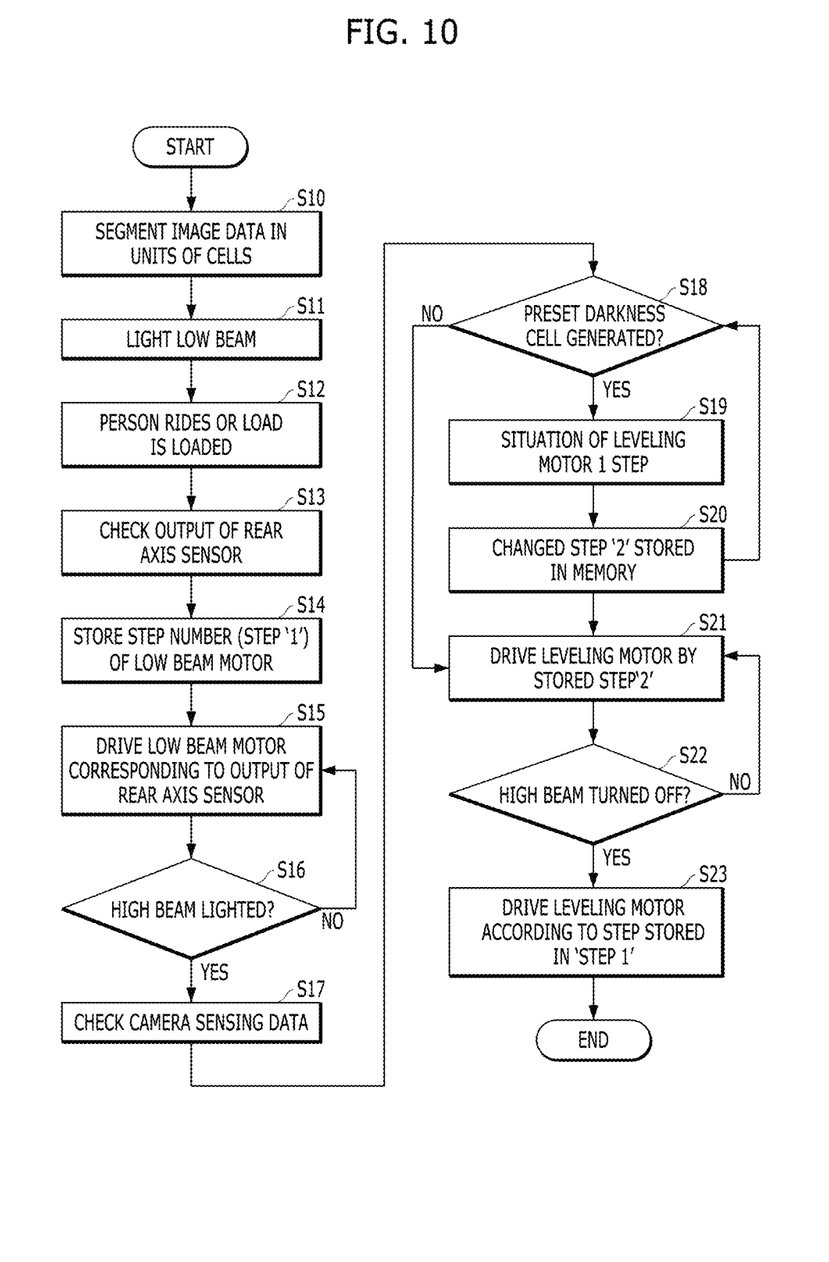
FIG. 10 is a flowchart showing a method of controlling a vehicular headlamp for preventing a shadow area according to an embodiment of the present disclosure.

FIG. 10 is a flowchart showing a method of controlling a vehicular headlamp for preventing a shadow area according to an embodiment of the present disclosure.

Referring to FIG. 10, a controller of a system for controlling a vehicular headlamp according to the present disclosure may receive a front image of the vehicle, which is captured and transmitted by a camera unit installed at a front side of the vehicle, and may segment the received front image data in units of preset cells (S10).

Then, a driver of the vehicle may turn on a low beam of the vehicular headlamp as necessary (S11).

In this case, since only the driver rides in the vehicle, a vehicle body is not inclined backward and an emission angle of the vehicular headlamp is maintained in a preset direction. Thus, the emission angle of the headlamp is not changed upward, as described above regarding the problem of the conventional art.

Another person other than the driver of the vehicle may additionally ride in the vehicle or freight or a load may be additionally loaded in the vehicle (S12).

In this case, when a current internal weight of the vehicle is equal to or greater than a preset weight, a rear axis sensor installed at a rear axis of the vehicle may transmit a preset output value to the controller. The controller may receive and check the output value of the rear axis sensor (S13).

Upon receiving an output value of the rear axis sensor, the controller may store a number of steps (Step '1') of the low beam motor for adjustment of leveling in a memory unit (S14) and may drive the low beam motor to correspond to the output value of the rear axis sensor of the vehicle (S15).

In this case, the controller may periodically determine whether the driver turns on a high beam (S16).

In this case, as the determination result, when the driver does not turn on the high beam, the controller may control the low beam motor to correspond to the output value of the rear axis sensor of the vehicle. On the other hand, when the driver turns on the high beam, the controller may detect the camera unit, may receive the transmitted sensing data of the camera unit, and may check the sensing data (S17).

Then, the controller may determine whether color information included in the sensing data of the camera unit is equal to or less than a preset reference value, in other words, whether a darkness cell is formed (S18).

As the determination result, when the darkness cell is formed, the controller may change the leveling motor upward by 1 step (S19) and may store a changed number of steps (Step '2') in the memory unit (S20).

As the determination result of operation S18, when the darkness cell is not formed, the controller may drive the leveling motor by a number of steps (Step '2') stored in the memory unit (S21).

Then, the controller may determine whether the high beam of the vehicular headlamp is turned off (S22).

As the determination result, when the high beam is not turned off, the image segment operation of a camera unit of operation S21 is repeatedly performed. On the other hand, when the high beam is turned off, it may be determined that the driver has set the headlamp to the low beam and the leveling motor may be driven according to the number of steps (Step '1') stored in the memory unit (S23).

Such a procedure of determining the shadow area in operation S18 in the operation of controlling the vehicular headlamp according to an embodiment of the present disclosure is described below in detail.

In order to determine the shadow area, the controller may determine a high beam region that is a road region in which the high beam of the headlamp reaches, a low beam region that is a road region in which the low beam reaches, a shadow area region in which color information positioned between the high beam region the low beam region is equal to or less than a preset reference value, and a surrounding region of the low beam region. The controller may also determine the shadow area based on the determination result.

First, a high beam region HB may be determined when a difference between a former cell value $CB_n$ with a specific number and a current cell value $CB'_n$ of a specific number is greater than a preset brightness variation threshold value X of a high beam of a headlamp ($CB_n - CB'_n > X$: HB).

In addition, a low beam region LB or a surrounding region may be determined when the difference between the former cell value $CB_n$ with the specific number and the current cell value $CB'_n$ of the specific number is smaller than a preset brightness variation minimum value Y of the headlamp ($CB_n - CB'_n < Y$). In this case, the low beam region LB and a surrounding region may be differently determined as follows: the low beam region LB may be determined when the former cell value $CB_n$ with the specific number is greater than a reference value Z of basic low beam brightness ($CB_n > Z$: LB). The surrounding region may be determined when the former cell value CBn with the specific number is smaller than the reference value Z of basic low beam brightness.

When a former cell section value in a shadow area prediction cell line is defined as the high beam region HB, if a difference between a current cell value at an arbitrary position of a shadow area prediction cell line and a current cell value positioned in a next line cell is greater than a brightness reference shadow area determination reference value A of the high beam region, as shown in FIG. 7, the controller may determine the current cell value as a shadow area region DN.

When the former cell section value in the shadow area prediction cell line is defined as the high beam region HB, if a difference between a current cell value of a cell at the earliest of the shadow area prediction cell line and a current cell value at the latest position is greater than the brightness reference shadow area determination reference value A of the high beam region, the controller may determine a current cell value at the latest position as the shadow area region DN.

For example, former cell values CB16 to CB20 in sections #16 to #20 may be defined as the high beam region HB (CB16 to CB20=HB), a current cell value CB'23 of #23 may be defined as the shadow area region DN (CB'(16)−CB'(23) >A) when a difference between a current cell value CB'16 of #16 and a current cell value CB'23 of #23 is greater than the brightness reference shadow area determination reference value A of the high beam region (CB'(16)−CB'(23)>A). Cells below the high beam region may be sequentially compared.

When a difference between a current cell value of #16 and a current cell value of #30 is greater than the brightness reference shadow area determination reference value of the high beam region, a former cell value of #23 may be defined as a shadow area region (CB'(16)−CB'(30)>A). Then, cells below the high beam region may be sequentially compared.

When a former cell value in the shadow area prediction cell line is defined as the high beam region HB, if a difference between a current value of a cell at the earliest position of the shadow area prediction cell line and a current cell value positioned at a cell line after the next cell line of the current value of the cell at the earliest position is greater than the brightness reference shadow area determination reference value of the high beam, the controller may determine a former cell value positioned at a next cell line of the cell at the earliest position of the shadow area prediction cell line section as the shadow area, as shown in FIG. 7.

For example, when a difference between a current cell value CB'16 of #16 and a current cell value CB'37 of #37 is smaller than the brightness reference shadow area determination reference value A of the high beam region, a former cell value CB37 of #37 may be defined as a low beam region (CB'16−CB'37<A), and then, former cell values CB23 to CB27 and CB30 to CB34 of #23 to #27 and #3 to #34 may be determined as the shadow area region DN (CB23 to CB27 and CB30 to CB34=DN).

In this example, each cell is referred to as 'CBn', n is a cell number, CBn is a former value, CB'n is a current value, X is a brightness variation threshold value of a high beam, HB is a high beam region, Y is a brightness variation minimum value, Z is a reference value of existing brightness of a low beam, LB is a low beam region, DN is a shadow area region, and A is a brightness reference shadow area determination reference value of the HB.

The above configured system and method of controlling a vehicular headlamp for preventing a shadow area according to at least one embodiment of the present disclosure may have the following advantages.

First, a shadow area formed between a low beam and a high beam of a headlamp may be prevented using a camera unit. Thus, an increase in weight or cost may be minimized to largely enhance merchantability and to also provide a stable road driving environment to a driver who drives a vehicle during the nighttime.

In addition, a headlamp may be minutely adjusted to prevent a shadow area via additional installation of a camera unit and a control operation of a controller. Thus, the investment cost for producing separate components may be saved and the corresponding technology may also be immediately applied to any type of vehicles that are currently produced.

It will be appreciated by persons having ordinary skill in the art that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid-state drive (SSD), a silicon disc drive (SDD), read-only memory (ROM), random-access memory (RAM), CD-ROM, magnetic tapes, floppy disks, optical data storage devices, etc.

It will be apparent to those having ordinary skill in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A system for controlling a vehicular headlamp for preventing a shadow area, the system comprising:
    a camera unit installed in front of a vehicle and configured to transmit front image data obtained by photographing a front side of the vehicle;
    a controller configured to periodically determine whether a high beam of the vehicular headlamp is lighted, to determine whether a darkness cell is formed in the front image data of the vehicle, which is transmitted from the camera unit, and, upon determining that the high beam is lighted, to change a leveling motor to be directed upward by 1 step upon determining that the darkness cell is formed, and to drive the leveling motor by a pre-stored number of steps (Step '2') upon determining that the darkness cell is not formed; and
    a memory unit configured to store a number of steps (Step '2') obtained by changing the leveling motor upward by 1 step,
    wherein the controller is further configured to
        segment the front image data of the vehicle in units of preset cells, and
        when a low beam of the vehicular headlamp is lighted and upon receiving an output value of a rear axis sensor of the vehicle, drive a low beam motor to correspond to the output value of the rear axis sensor when an additional passenger rides in the vehicle or a freight or a load is additionally loaded in the vehicle, wherein the output value is transmitted by the rear axis sensor of the vehicle to the controller when an internal weight of the vehicle is equal to or greater than a preset weight value, and upon receiving the output value, the memory unit is further configured to store a number of steps (Step '1') of the low beam motor for adjustment of leveling.

2. The system of claim 1, wherein the controller periodically determines whether the high beam of the vehicular headlamp is turned off, and repeatedly performs a driving operation of the leveling motor when the high beam is not turned off, and on the other hand, when the high beam is turned off, the controller drives the leveling motor according to a pre-stored number of steps (Step '1').

3. The system of claim 1, wherein:

when determining whether the darkness cell is formed, the controller determines a high beam region HB when a difference between a former cell value CBn with a specific number and a current cell value CB'n of a specific number is greater than a preset brightness variation threshold value X of the high beam of the headlamp, and the controller determines a low beam region LB or a surrounding region when the difference between the former cell value CBn with the specific number and the current cell value CB'n of the specific number is smaller than a preset brightness variation minimum value Y of the headlamp; and when a former cell section value in a shadow area prediction cell line is defined as the high beam region HB, the controller determines the current cell value as a shadow area region DN if a difference between a current cell value at an arbitrary position of the shadow area prediction cell line and a current cell value positioned in a next line cell is greater than a brightness reference shadow area determination reference value A of the high beam region.

4. The system of claim 3, wherein, when the former cell section value in the shadow area prediction cell line is defined as the high beam region HB, if a difference between a current value of a cell at the earliest position of the shadow area prediction cell line and a current cell value positioned at a cell line after the next cell line of the current value of the cell at the earliest position is greater than the brightness reference shadow area determination reference value of the high beam region, the controller determines a former cell value positioned at a next cell line of the cell at the earliest position of the shadow area prediction cell line section as the shadow area.

5. A method of controlling a vehicular headlamp for preventing a shadow area, the method comprising:

periodically determining whether a high beam of the vehicular headlamp of a vehicle is lighted;

as a result of the determining, upon determining that the high beam is lighted, determining whether a darkness cell is formed in front image data of the vehicle, which is transmitted from a camera unit;

as a result of the determining, upon determining that the darkness cell is formed, changing a leveling motor to be directed upward by 1 step and storing a changed number of steps (Step '2');

as a result of the determining, upon determining that the darkness cell is not formed, driving the leveling motor by the pre-stored number of steps (Step '2'); and prior to the periodically determining whether the high beam is lighted segmenting the front image data of the vehicle in units of preset cells, when a low beam of the vehicular headlamp is lighted, checking an output value of a rear axis sensor when an additional passenger rides in the vehicle or a freight or a load is additionally loaded in the vehicle, wherein the output value is transmitted by the rear axis sensor of the vehicle to the controller when an internal weight of the vehicle is equal to or greater than a preset weight value; and upon receiving the output value of the rear axis sensor, storing a number of steps (Step '1') of the low beam motor for adjustment of leveling and driving the low beam motor to correspond to the output value of the rear axis sensor.

6. The method of claim 5, further comprising:

after the driving of the leveling motor, periodically determining whether the high beam of the vehicular headlamp is turned off; and as a result of the determining, upon determining that the high beam is not turned off, repeatedly performing a driving operation of the leveling motor, and on the other hand, upon determining that high beam is turned off, driving the leveling motor according to a pre-stored number of steps (Step '1').

7. The method of claim 5, wherein:

the determining whether the darkness cell is formed includes: determining a high beam region HB when a difference between a former cell value CBn with a specific number and a current cell value CB'n of a specific number is greater than a preset brightness variation threshold value X of the high beam of the headlamp; and determining a low beam region LB or a surrounding region when the difference between the former cell value CBn with the specific number and the current cell value CB'n of the specific number is smaller than a preset brightness variation minimum value Y of the headlamp; and when a former cell section value in a shadow area prediction cell line is defined as the high beam region HB, if a difference between a current cell value at an arbitrary position of the shadow area prediction cell line and a current cell value positioned in a next line cell is greater than a brightness reference shadow area determination reference value A of the high beam region, the current cell value is determined as a shadow area region DN.

8. The method of claim 7, wherein the former cell section value in the shadow area prediction cell line is defined as the high beam region HB, if a difference between a current value of a cell at the earliest position of the shadow area prediction cell line and a current cell value positioned at a cell line after the next cell line of the current value of the cell at the earliest position is greater than the brightness reference shadow area determination reference value of the high beam region, a former cell value positioned at a next cell line of the cell at the earliest position of the shadow area prediction cell line section is determined as the shadow area.

\* \* \* \* \*